United States Patent
O'Shaughnessy et al.

(10) Patent No.: US 11,005,243 B2
(45) Date of Patent: May 11, 2021

(54) AIRCRAFT CABLE ROUTING SYSTEM AND METHOD OF INSTALLATION THEREOF

(71) Applicant: Airbus Operations Limited, Bristol (GB)

(72) Inventors: Paul O'Shaughnessy, Bristol (GB); Javier Ruiz-De-Pablo, Bristol (GB); Anthony Bryant, Bristol (GB); Scott Palmer, Bristol (GB); James Bird, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/451,566

(22) Filed: Jun. 25, 2019

(65) Prior Publication Data
US 2020/0006927 A1    Jan. 2, 2020

(30) Foreign Application Priority Data

Jun. 29, 2018   (GB) ...................................... 1810740

(51) Int. Cl.
*H02G 3/04*        (2006.01)
*H02G 3/38*        (2006.01)
*H02G 1/08*        (2006.01)

(52) U.S. Cl.
CPC ......... *H02G 3/0437* (2013.01); *H02G 3/0418* (2013.01); *H02G 3/38* (2013.01); *H02G 1/08* (2013.01)

(58) Field of Classification Search
CPC ...... H01B 7/045; H01B 7/0045; H02G 3/263; H02G 3/0418; H02G 3/03; B64D 11/06;
(Continued)

(56) References Cited

U.S. PATENT DOCUMENTS 4,627,469 A * 12/1986 Buard ................. H02G 3/0425
                                                              138/92
4,907,767 A *  3/1990 Corsi .................. H02G 3/0418
                                                              138/162
(Continued)

FOREIGN PATENT DOCUMENTS

EP       2 624 388        8/2013
GB          990885         5/1965
(Continued)

OTHER PUBLICATIONS

Combined Search and Examination Report for GB1810740.9, dated Dec. 11, 2018, 7 pages.

*Primary Examiner* — William H. Mayo, III
*Assistant Examiner* — Krystal Robinson
(74) *Attorney, Agent, or Firm* — Nixon & Vanderhye P.C.

(57) ABSTRACT

A cable routing system is disclosed having dielectric, or insulating, liner which is installed within a cable routing channel, or raceway, to subdivide the channel into at least two secondary channels. This can achieve more efficient use of space and enable more flexible placement of cables within the channels while meeting safety requirements. Installation of cables into the channel can include inserting the cables into the dielectric liner before the installation of the dielectric liner into the cable routing channel. The cable routing system can be used in an aircraft, including within space-constrained areas of the aircraft such as inside a wing.

17 Claims, 9 Drawing Sheets

(58) Field of Classification Search
CPC ... B64D 11/00; B64D 11/0616; B64D 11/062;
B64D 1/02; B64D 7/00; B64D 2221/00;
B64D 3/00; B64D 11/0624; B64D 45/00;
B64D 43/00; B64D 47/00; B64D
11/0015; B64D 15/12; B64D 11/0023;
B64D 11/06395; B64D 11/0696; B64D
13/00; B64D 1/04; B64D 2011/0046;
B64D 2011/0053; B64D 2045/0065;
B64D 2045/0075; B64D 2045/0085;
B64D 2203/00; B64D 37/04; B64D
45/0059; B64D 47/02; B64D 47/06;
H02P 2101/30
See application file for complete search history.

(56) References Cited

U.S. PATENT DOCUMENTS

| | | | | |
|---|---|---|---|---|
| 5,159,154 | A * | 10/1992 | Hillis | H01B 7/08 |
| | | | | 174/9 R |
| 5,235,136 | A * | 8/1993 | Santucci | H02G 3/266 |
| | | | | 174/101 |
| 5,274,194 | A * | 12/1993 | Belcher | H02G 3/0418 |
| | | | | 174/50 |
| 5,665,936 | A * | 9/1997 | Sawamura | H01B 7/0045 |
| | | | | 174/27 |
| 5,704,175 | A * | 1/1998 | Lewis | H02G 3/0431 |
| | | | | 174/482 |
| 5,792,992 | A * | 8/1998 | Handler | H02G 3/0431 |
| | | | | 174/101 |
| 6,107,576 | A * | 8/2000 | Morton | H02G 3/0418 |
| | | | | 174/101 |
| 6,437,243 | B1 * | 8/2002 | VanderVelde | H02G 3/0418 |
| | | | | 174/101 |
| 6,513,289 | B1 * | 2/2003 | Decore | H02G 3/0406 |
| | | | | 16/225 |
| 6,518,772 | B1 * | 2/2003 | Milkovic | G01R 31/1272 |
| | | | | 324/536 |
| 6,528,728 | B1 * | 3/2003 | Shima | H02G 3/0437 |
| | | | | 174/101 |
| 6,646,203 | B1 * | 11/2003 | Liao | H02G 3/0418 |
| | | | | 174/491 |
| D484,469 | S * | 12/2003 | Thibault | D13/184 |
| 6,972,367 | B2 * | 12/2005 | Federspiel | H02G 3/0418 |
| | | | | 174/481 |
| 7,112,746 | B2 * | 9/2006 | Tsukahara | H02G 3/26 |
| | | | | 174/117 F |
| 7,193,159 | B2 * | 3/2007 | Makwinski | H02G 3/00 |
| | | | | 174/480 |
| D539,755 | S * | 4/2007 | Makwinski | D13/155 |
| 7,262,371 | B2 * | 8/2007 | Makwinski | H02G 3/0418 |
| | | | | 174/480 |
| 7,381,899 | B2 * | 6/2008 | Pfluger | H02G 3/32 |
| | | | | 174/92 |
| RE41,353 | E * | 5/2010 | McGrath | H04Q 1/064 |
| | | | | 385/134 |
| 7,829,797 | B2 * | 11/2010 | VanderVelde | H02G 3/128 |
| | | | | 174/481 |
| 7,939,759 | B2 * | 5/2011 | Henry | H02G 3/0406 |
| | | | | 174/68.1 |
| 8,079,186 | B2 * | 12/2011 | Williams | E04B 9/005 |
| | | | | 52/220.6 |
| D652,568 | S * | 1/2012 | Trzesniowski | D26/138 |
| 8,217,266 | B2 * | 7/2012 | Caveney | H02G 3/045 |
| | | | | 174/88 R |
| 8,436,245 | B2 * | 5/2013 | Ayme | H02G 3/0437 |
| | | | | 174/99 R |
| 8,697,993 | B2 * | 4/2014 | Jur | H02G 5/06 |
| | | | | 174/68.3 |
| 8,842,960 | B2 * | 9/2014 | Berglund | G02B 6/4495 |
| | | | | 385/136 |
| 9,036,368 | B2 * | 5/2015 | Chen | H02G 3/045 |
| | | | | 361/826 |
| 9,193,311 | B2 * | 11/2015 | Siegel | B60L 50/10 |
| 9,263,172 | B2 * | 2/2016 | Lotfi | B23K 26/40 |
| 9,551,439 | B2 * | 1/2017 | Gundel | G02B 6/4471 |
| 9,799,426 | B2 * | 10/2017 | Gundel | H01B 11/002 |
| 10,305,270 | B2 * | 5/2019 | Kuboki | H02G 11/006 |
| 10,443,827 | B2 * | 10/2019 | Lax | H02G 3/0437 |
| 10,522,990 | B1 * | 12/2019 | Klein | B64D 47/00 |
| 2003/0089515 | A1 * | 5/2003 | Federspiel | H02G 3/0437 |
| | | | | 174/480 |
| 2005/0074218 | A1 | 4/2005 | McLarty, III | |
| 2007/0095561 | A1 * | 5/2007 | Lubanski | H02G 3/0487 |
| | | | | 174/135 |
| 2007/0144778 | A1 * | 6/2007 | Henry | H02G 3/383 |
| | | | | 174/506 |
| 2009/0007191 | A1 * | 1/2009 | Furio | B64D 11/0624 |
| | | | | 725/75 |
| 2009/0026318 | A1 * | 1/2009 | Gross | B64D 11/003 |
| | | | | 244/131 |
| 2009/0260846 | A1 | 10/2009 | Henry | |
| 2012/0090866 | A1 * | 4/2012 | Gundel | H01B 7/0838 |
| | | | | 174/34 |
| 2013/0248218 | A1 * | 9/2013 | Glew | H01B 11/1895 |
| | | | | 174/34 |
| 2014/0332640 | A1 * | 11/2014 | Breuer | B64F 5/10 |
| | | | | 248/68.1 |
| 2016/0365177 | A1 * | 12/2016 | Mohlman | B65H 49/00 |

FOREIGN PATENT DOCUMENTS

| | | |
|---|---|---|
| GB | 1 214 938 | 12/1970 |
| WO | 2014/165904 | 10/2014 |
| WO | 2017/193128 | 11/2017 |

* cited by examiner

AIRCRAFT CABLE ROUTING SYSTEM AND METHOD OF INSTALLATION THEREOF

CROSS RELATED APPLICATION

This application claims priority to United Kingdom (GB) Patent Application 1810740.9, filed Jun. 29, 2018, the entire contents of which are hereby incorporated by reference.

TECHNICAL FIELD

The present invention relates to cable routing systems for aircraft and a method of installing a cable routing system.

BACKGROUND

An aircraft contains cables for many different purposes including: transmitting and receiving data, such as sensor data, electrical power and control signals. As the design of aircraft increases in complexity, so does the complexity of the cabling required, both in terms of routes and number of cables. Several separate cables may follow the same route through the aircraft.

Dedicated channels, known as raceways, may be provided to hold and protect cables along their route. A plurality of cables can be installed in the same raceway and more than one raceway can be provided running parallel to each other. In order to ensure electrical and operational safety, there are guidelines covering which cables can be installed in the same channel, which cables can be installed in contiguous channels, and whether further shielding or protection from other cables in the same channel is required. Some cable types may require routing completely separately from the channels. Thus, the installation of cables into an aircraft is complex, as is any required maintenance after installation.

SUMMARY

According to a first aspect of the present invention, there is provided an aircraft cable routing system comprising: a routing fixture defining a primary channel; and a dielectric liner for insertion into the primary channel. The dielectric liner comprises at least one subdividing element such that, when inserted into the primary channel, the dielectric liner divides the primary channel into at least two secondary channels positioned within the primary channel.

Optionally, the dielectric liner defines at least two open secondary channels which are at least partially open along their length.

Optionally, the dielectric liner defines a closed secondary channel. The dielectric liner may be an assembly comprising a first liner part and a second liner part, and the closed secondary channel is defined by both the first liner part and the second liner part.

Optionally, the dielectric liner comprises a retention feature for retaining the dielectric liner in the primary channel.

Optionally, the routing fixture comprises a retention feature for retaining the dielectric liner in the primary channel.

Optionally, a length of the at least two secondary channels is greater than a length of the primary channel. The aircraft cable routing system may comprise a second routing fixture defining a second primary channel. In use, the second routing fixture may be spaced apart from the routing fixture and the dielectric liner is engaged with both the primary channel and the second primary channel such that the dielectric liner extends between the routing fixture and the second routing fixture.

Optionally, the dielectric liner comprises thermoplastic composite material, thermoset material, thermoset composite material or a combination thereof.

Optionally, a dielectric is at least 0.5 mm thick between secondary channels.

Optionally, the primary channel is conductive.

Optionally, the primary channel is not conductive

According to a second aspect of the present invention, there is provided an aircraft wing comprising an aircraft cable routing system as described above, with or without any of the optional features also described, and at least one cable contained in a secondary channel of the aircraft cable routing system.

According to a third aspect of the present invention, there is provided an aircraft comprising an aircraft cable routing system as described above, with or without any of the optional features also described, and at least one cable contained in a secondary channel of the aircraft cable routing system.

According to a fourth aspect of the present invention, there is provided a method of installing cables into an aircraft. The method comprises: providing a routing fixture on a structural component of an aircraft, wherein the routing fixture defines a primary channel; providing a dielectric liner separately from the routing fixture, wherein the dielectric liner is for insertion into the primary channel and defines at least two secondary channels; routing a first cable in a first secondary channel of the dielectric liner; routing a second cable in a second secondary channel of the dielectric liner; and inserting the dielectric liner into the primary channel after the routing a first cable and the routing a second cable, such that the at least two secondary channels are contained within the primary channel.

Optionally, the dielectric liner comprises: a first liner part which at least partially defines the first secondary channel; and a second liner part which at least partially defines the second secondary channel. The method comprises: inserting the first liner part into the primary channel; and inserting the second liner part into the primary channel after the inserting the first liner part.

Optionally, a length of the at least two secondary channels is greater than a length of the primary channel. The method comprises: providing a second routing fixture on a structural component of the aircraft spaced apart from the routing fixture, wherein the second routing fixture defines a second primary channel; and inserting the dielectric liner into both the primary channel and the second primary channel after the routing a first cable and the routing a second cable such that the dielectric liner extends between the routing fixture and the second routing fixture.

According to a fifth aspect of the present invention, there is provided a cable routing system for an aircraft comprising: a raceway; and an insulating liner for insertion into the raceway. The insulating liner comprises at least one subdividing wall such that, when inserted into the raceway, the dielectric liner divides the raceway into at least two separate channels positioned within the raceway.

BRIEF DESCRIPTION OF THE DRAWINGS

Embodiments of the invention will now be described, by way of example only, with reference to the accompanying drawings, in which.

DETAILED DESCRIPTION

Channels or raceways can be an efficient way of routing cables. However, their use can become complex and inefficient as the number of cables installed in each raceway increases. While a raceway can contain many cables, it becomes difficult to install and maintain those cables as the number of cables increases. For example, installation generally requires routing each cable into the channel individually as required. Identification or removal of a particular cable for maintenance can also be difficult.

In an aircraft, safety requirements require that some cables are segregated from others. For example, control signals sent according to ATA-27 (Air Transport Association Chapter 27—Flight Controls) are required to surrounded in a separate sheath according to DIN EN6047-007 to segregate them from any other cables in the raceway and provide additional protection. This further complicates installation.

Some cables cannot be routed in the same raceway as others, to provide physical protection against electrical hazards should a cable before damaged. It can therefore be necessary provide several parallel raceway channels to provide the required separation, increasing the space required for the installation. For example, cables operating at 115V ac may be required to have at least one raceway channel between them to provide protection against electrical faults. Any such intervening raceways can only be used for routing low voltage cables, such as those running at up to 28V dc.

Other cables may not be routed in a raceway at all, for example cables operating at above 115 V ac and 28V dc may be provided outside of raceways and individually routed or shielded. Examples of such cables include those operating at 230 V ac and 540 V dc.

It would be desirable to provide an improved method of routing cables within an aircraft.

Figure 1A:
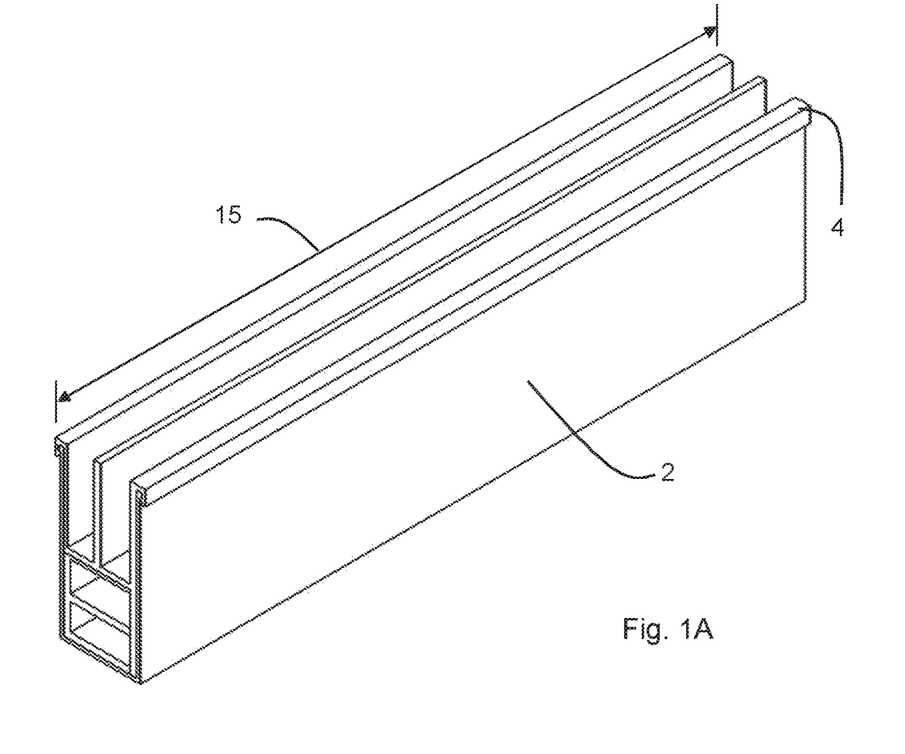
FIG. 1A is a schematic three-dimensional view of a cable raceway and liner according to an embodiment.
Figure 1B:
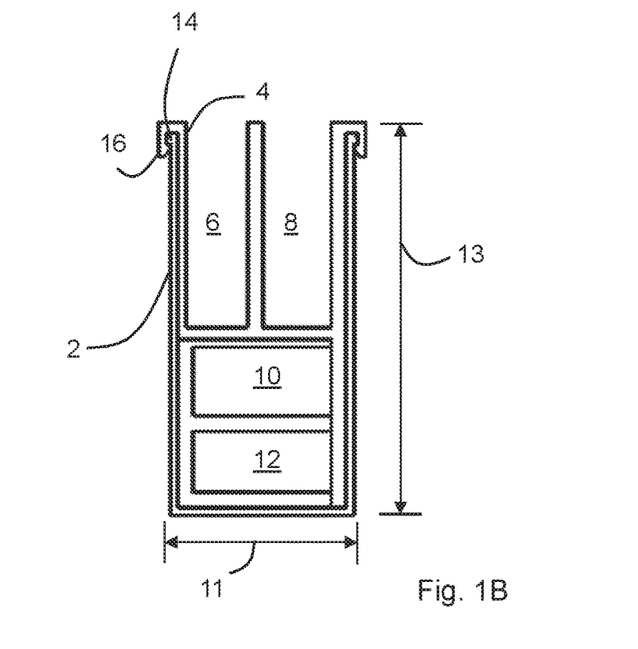
FIG. 1B is a schematic end view of the cable raceway and liner of FIG. 1A.

FIG. 1A depicts a three-dimensional view of an aircraft cable routing system according to an embodiment, an end view of the aircraft cable routing system is shown in FIG. 1B. The system comprises a routing fixture 2 defining a primary channel, also referred to as a raceway. A dielectric, or insulating, liner 4 is inserted into the primary channel 2. The dielectric liner comprises subdividing elements which divide the primary channel 2 into four secondary channels 6, 8, 10, 12 in this example. Two of the secondary channels 6, 8 are open along their length and the other two secondary channels 10, 12 are closed along their length. As shown FIG. 1A, the secondary channels 6,8 are open along their entire length, although in other examples they may be only partially open. The closed secondary channels 10, 12 are closed along their length but still open at their ends, as can be seen in FIG. 1A, to allow cables to enter and exit the closed secondary channels 10,12 in use, at the ends of the closed secondary channels 10, 12.

By providing the secondary channels 6, 8, 10, 12 within the primary channel, a single primary channel can carry a plurality of cables in each channel while providing increased segregation and separation between cables to ensure safety requirements or other design requirements are met. For example, it may allow routing of electrical cables with multiple different voltages and currents in the same primary channel, by separating the cables into secondary channels. The dielectric liner and the secondary channels it defines may act to contain electrical arcing events within a secondary channel. This can result in a more compact cable routing system as the number of raceways required can be reduced; rather than provide separate raceways for each voltage and current rating of cable, these can instead be segregated by the secondary channels.

In this example, the cross-section has an overall width (shown by element 11 in FIG. 1B) of about 27 mm and height (shown by element 13 in FIG. 1B) of about 51 mm. A secondary channel 6, 8, 10, 12 may have a width of at least 8 mm. In this example, the open secondary channels 6, 8 have a width of about 8 mm and the closed secondary channels 10, 12 have a width of about 18 mm. The closed secondary channels 10,12 have a height of about 9 mm and the open secondary channels 6, 8 have a height of about 29 mm. The length of the assembly (shown by element 15 in FIG. 1A) can vary depending on the length of the underlying structure. In other examples, the dimensions will vary depending on the requirements of the application, such as the number and diameter of the cables to be received in a particular secondary channel.

As can be seen most clearly in FIG. 1B, the dielectric liner 2 is engaged with the primary channel 2 through the interaction of a lip, protrusion or flange 14 formed on the primary channel 2 which engages a corresponding hook or retention feature 16 formed on the dielectric liner 4. Together these provide corresponding retention features on the primary channel and the dielectric liner. A snap-fit, or interlocking, connection may be provided to retain the dielectric liner in place in the primary channel.

Other examples may use other retention elements, for example, the dielectric liner may have a hook section which is biased inwards to engage a wall of the primary channel when inserted, this can allow engagement of the dielectric liner with the primary channel without needed to provide a corresponding retention feature on the dielectric liner. In further examples, only the primary channel may be provided with a retention feature, such as an inwardly facing ridge or protrusion, to engage the dielectric liner.

Figure 2:
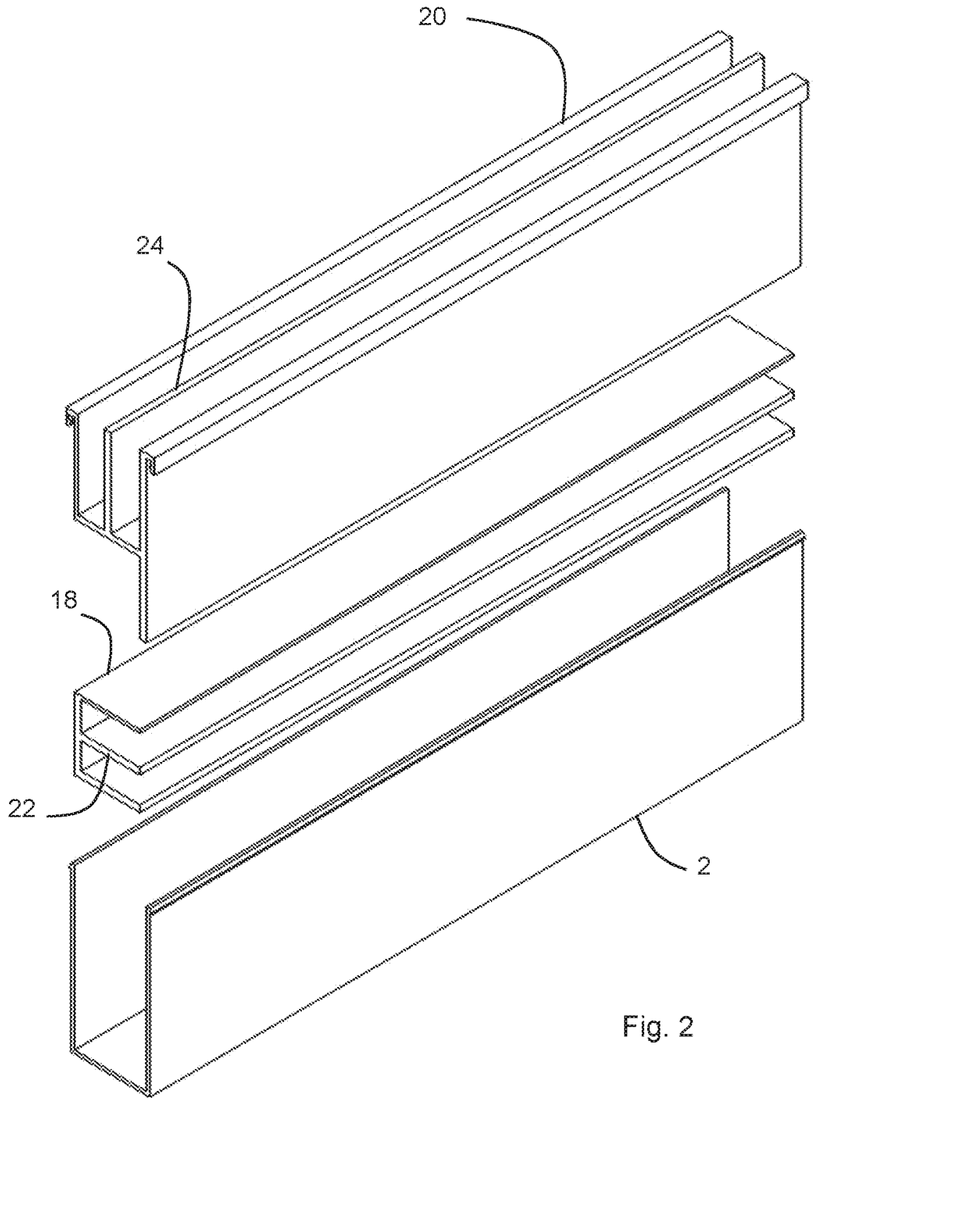
FIG. 2 is a schematic exploded view of the cable raceway and liner of FIG. 1A.

The dielectric liner depicted in FIGS. 1A and 1B is assembled from two separate parts, this can be seen most clearly in the exploded diagram of FIG. 2. The dielectric liner comprises a first liner part 18 and a second liner part 20. Each of the first and second liner parts 18 and 20 define secondary channels which are open along their length before assembly of the cable routing system through the provision of subdividing elements 22, 24 which extend from a base or side of the liner part. This allows cables to be installed lengthways in the liner part before assembly of the cable routing system using the opening along the length of the channel. Lengthwise installation of cables can be quicker and simpler than inserting the cables from an open end and advancing them down the channel to the other end, which would otherwise be necessary for a channel which is closed along its length.

Figure 3:
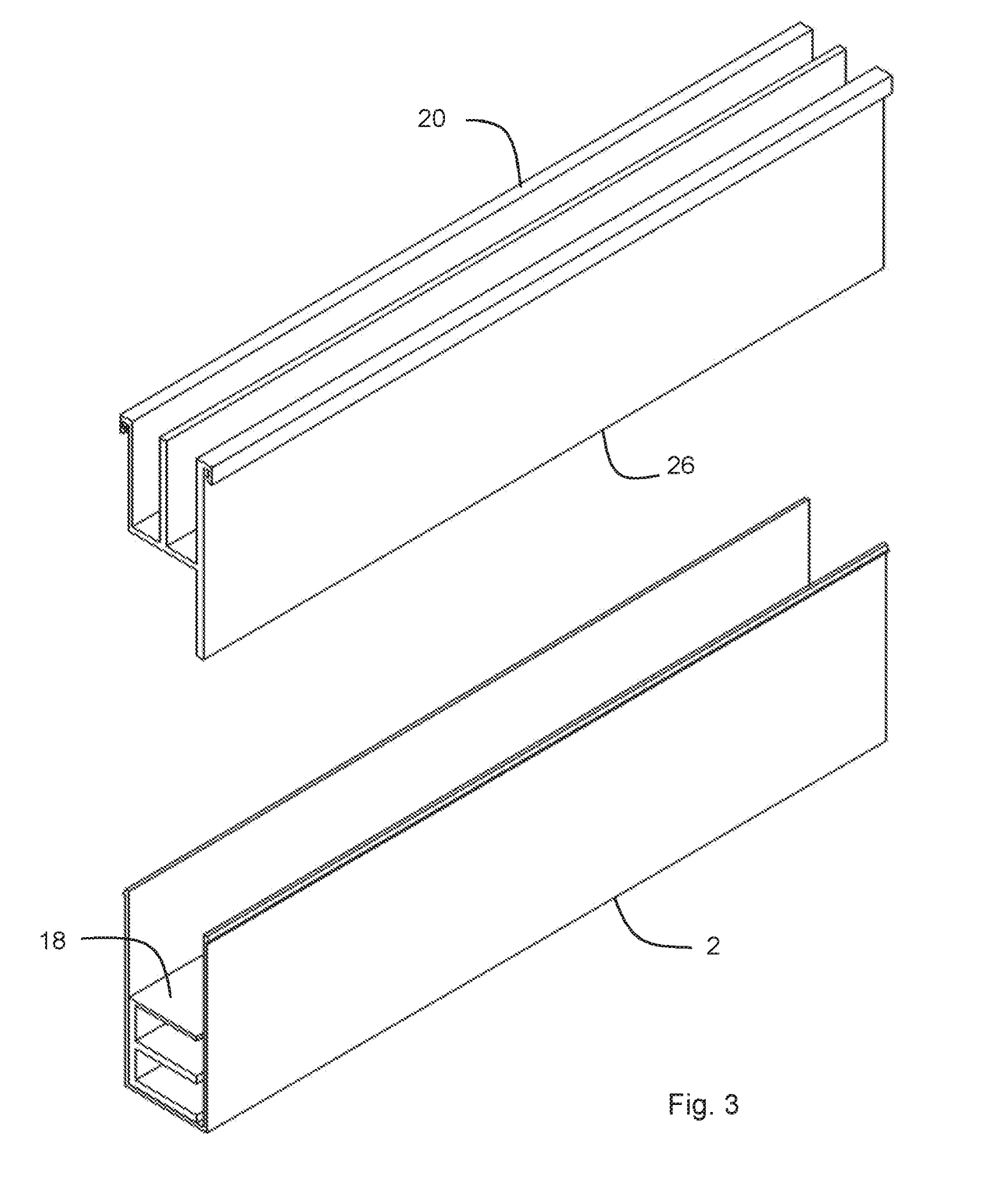
FIG. 3 is a schematic, exploded, partially assembled view of the cable raceway and liner of FIG. 1A.

FIG. 3 depicts a three-dimensional view of a partially assembled cable routing system of FIG. 1A, with the cables omitted for clarity. The first liner part 18 has been inserted into the primary channel 2 before second liner part 20. The open secondary channels of the first liner part are partially closed by the insertion into the primary channel 2. A small gap or space is provided between the open side of the secondary channels and the adjacent wall of the primary channel 2. This gap is filled by a wall or closure element 26 which extends from the second liner part in the direction towards the first liner part when assembled. The closure element 26 closes the channels in the first liner part when the second liner part is inserted into the primary channel. In this way the closed secondary channels are surrounded by dielectric or insulating material along their length. In use, the retention elements of the second liner part also hold the first liner part in place within the primary channel by the abutment of the first liner part with the second liner part. In other examples, additional retention elements may be provided to retain the first liner part and the second liner part assembled independently.

In other examples, the dielectric liner may be assembled before insertion into the primary channel, rather than being assembled during insertion as shown in FIG. 3. For example, the first and second liner parts may be assembled outside of the primary channel and then inserted together.

In other examples, the closure of the secondary channels in the first liner part may be achieved in other ways. In the dielectric liner of FIG. 2, the opening direction of the secondary channels in the first liner part before assembly is perpendicular to the opening direction of the secondary channels in the second liner part. In other examples, the opening direction may be the same for both the first liner part and the second part; in other words, the opening of the channels in the first liner part may be rotated through 90° anti clockwise so that its channels are accessed in the same direction as the channels in the second liner part. The closure element 26 may then be omitted from the second liner part.

In another example, the secondary channels within the dielectric liner may be formed from an assembly of at least two liner parts in other ways, for example a first liner part may be substantially "U" shaped to conform to the shape of the primary channel and a substantially flat, substantially "T"-shaped, or substantially "+"-shaped second liner part inserted in the first liner part to form the channels. In this example, the second liner part may engage a toothed or ridged section provided by the first liner part to ensure a secure assembly.

Figure 4A:
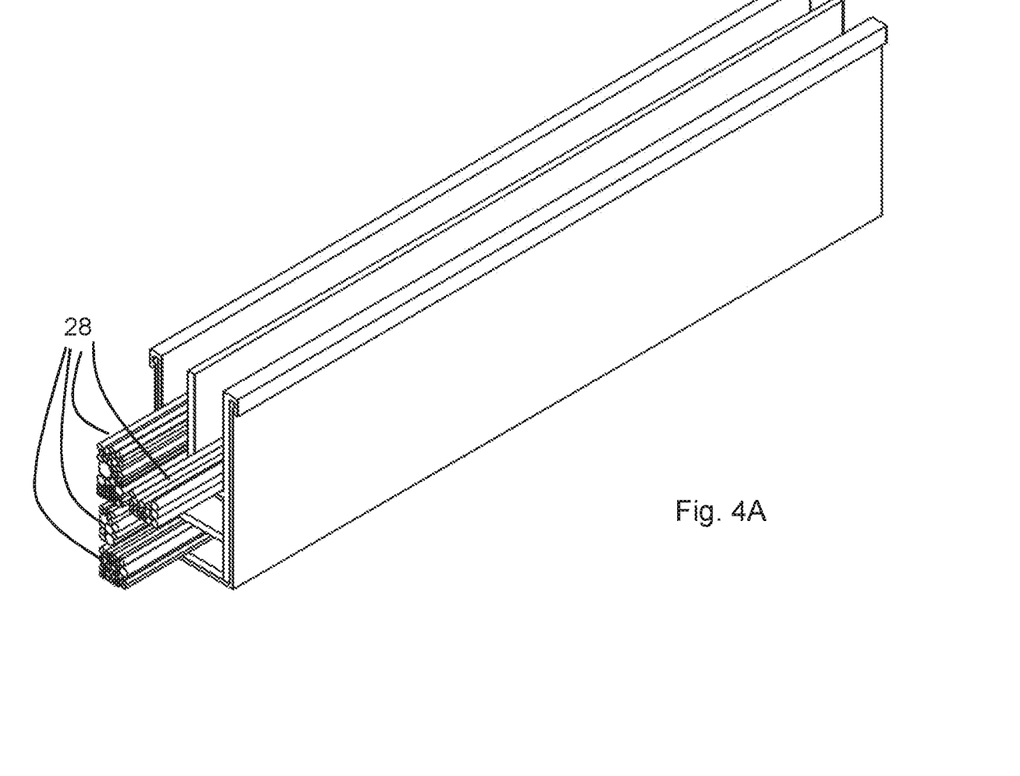
FIG. 4A is a schematic three-dimensional view of the cable raceway and liner of FIG. 1A with cables installed therein.
Figure 4B:
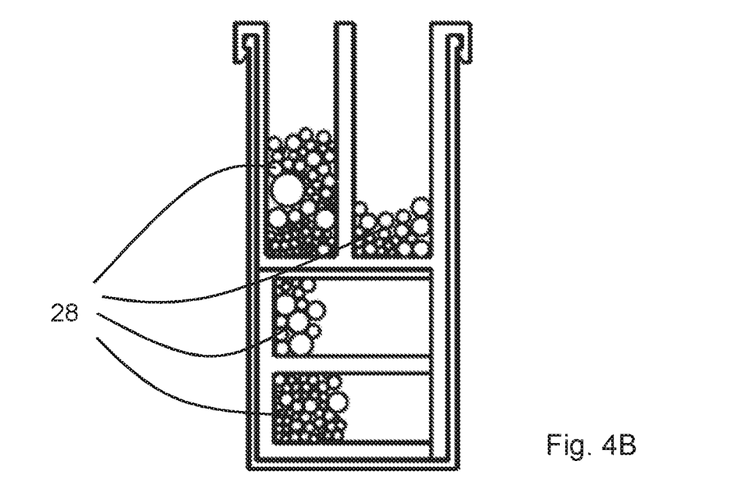
FIG. 4B is a schematic end view of the cable raceway and liner of FIG. 1A with cables installed therein.

FIGS. 4A and 4B depict three-dimensional and end views of the cable routing system of FIG. 1A when assembled with cables 28 in use. It can be seen that a plurality of cables are provided in each secondary channel, and that these cables are of a variety of diameters.

The dielectric liner can be made of any suitable insulating material, such as a polymer material, including thermoplastic composite material, thermoset material, thermoset composite material or a combination thereof. Specific example materials include polyamides (such as Nylon, more specifically Nylon-66, Nylon-12 or another engineered polyamide), polytetrafluoroethylene (PTFE) and polypropylene (PP).

The dielectric liner preferably provides walls or subdividing elements between the secondary channels which are at least 0.5 mm thick, at least 1 mm think or at least 2 mm think. The walls or subdividing elements may have a maximum thickness between secondary channels of 3 mm, 4 mm or 5 mm. These thicknesses provide sufficient protection against a live voltage in the event of a fault occurring in the secondary channel while limiting the space within the primary channel taken up by the walls or subdividing elements.

The dielectric liner and routing fixture can be manufactured by any suitable method, for example extrusion, injection moulding or additive manufacturing.

The primary channel or raceway can be made from a conductive material, for example a metallic material (such as Aluminium), a carbon-impregnated material or a composite structure comprising conductive elements. This provides protection against electromagnetic hazards (EMH) which penetrate the dielectric liner, which may be case for higher voltages or higher currents. A conductive primary channel may also provide additional EMH protection for the installed cable. Conductive primary channels may also be used on an aircraft with a composite structure as part of the aircraft Metallic Bonding Network for the purpose of diverting lightning current and conducting equipment fault current.

The primary channel or raceway can also be made from a dielectric or insulating material, for example when the cables carried are optical so that protection from electrical hazards is less important.

The routing fixture and primary channel can be manufactured by any suitable method, including extrusion or additive manufacturing.

Figure 5:
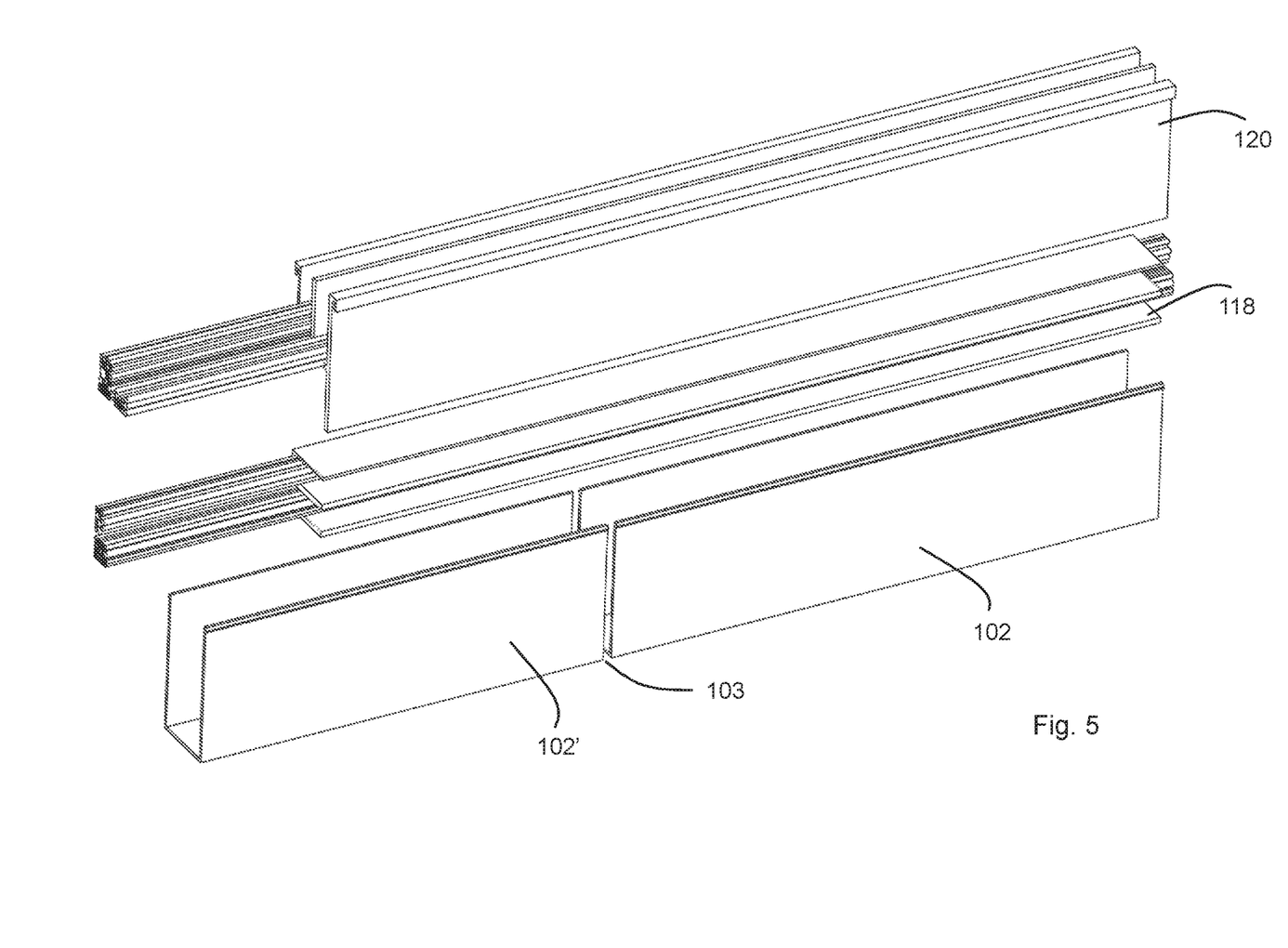
FIG. 5 is a schematic exploded view of a cable liner which can extend between two raceways according to an embodiment.

Referring now to FIG. 5, a three-dimensional view of a dielectric liner which can extend between two separate primary channels is depicted. The dielectric liner has the same two-part construction as the dielectric liner of FIG. 1A and is shown in exploded form in FIG. 5. A first liner part 118 and a second liner part 120 are provided which have a length sufficient to extend between two adjacent primary channels defined by a first and second routing fixture 102, 102'. The adjacent primary channels are aligned along a longitudinal axis of the primary channel, such that the first liner part 118 and the second liner part 120 can be inserted into both the first primary channel and the second primary channel and the assembled dielectric liner then bridges a gap 103 between the two routing fixtures 102, 102'.

Figure 6:
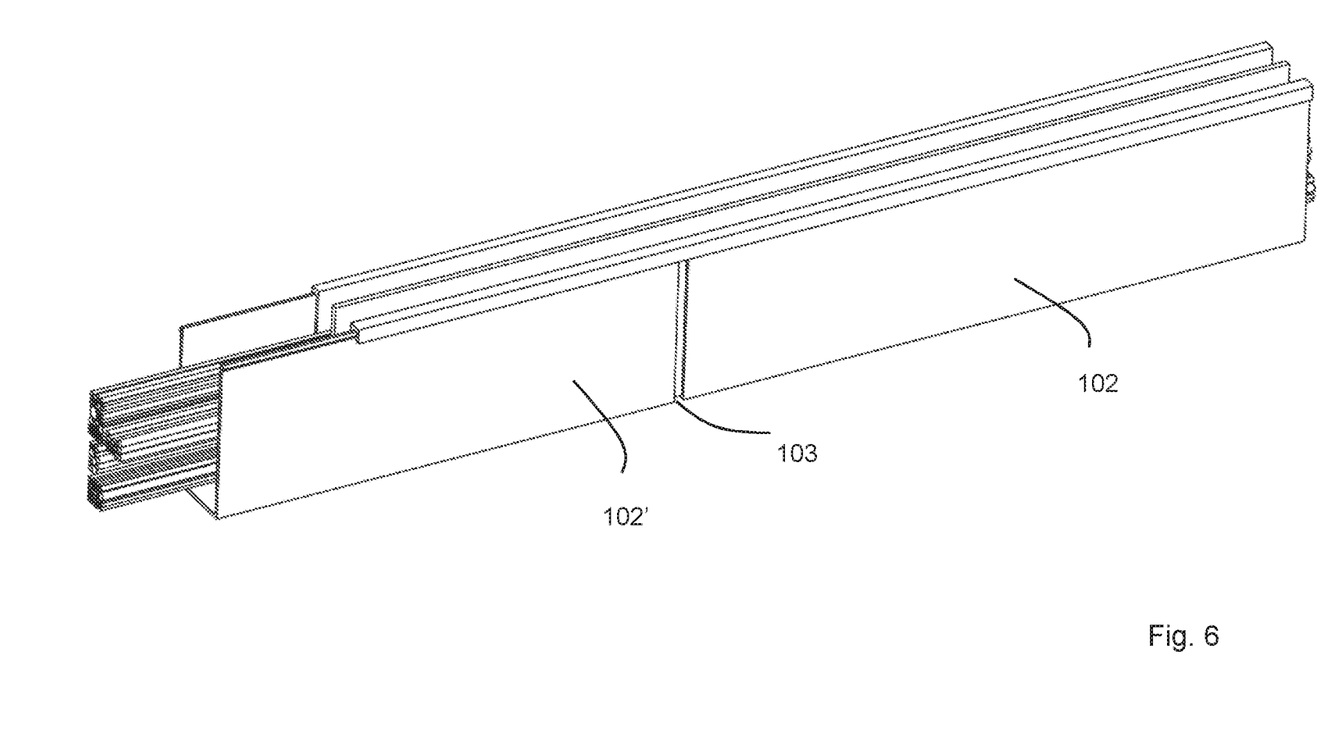
FIG. 6 is a schematic three-dimensional view of the cable liner of FIG. 5 extending between two raceways.

FIG. 6 depicts the system of FIG. 5 assembled. The liner extends between the routing fixtures 102, 102' so that additional insulating parts, cladding or protection in that exposed section are not required, which can simplify installation and part count.

Although FIGS. 5 and 6 depict the dielectric liner as slightly shorter than the two routing fixtures, other examples may have a dielectric liner which is the same length, or longer than the routing fixtures.

Figure 7:
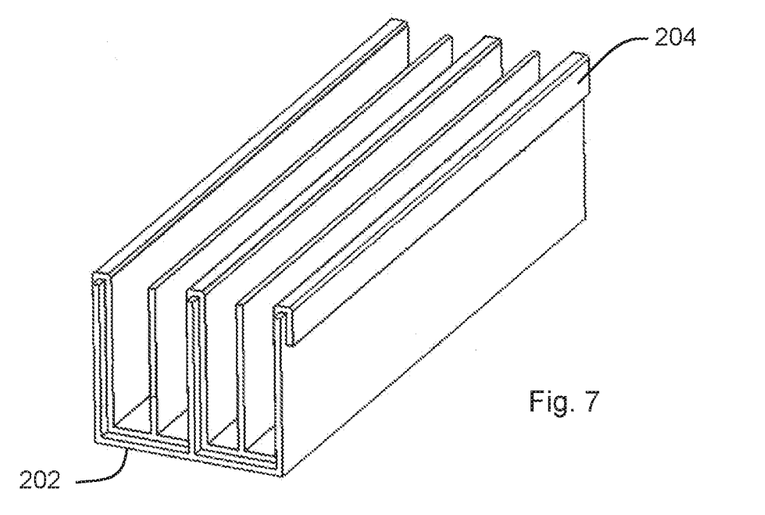
FIG. 7 is a schematic three-dimensional view of a cable raceway and liner according to another embodiment.

FIG. 7 is a three-dimensional view of a further embodiment of a cable routing system. A routing fixture 202 defines two parallel primary channels, which are arranged side-by-side. A single dielectric liner 204 is inserted into both the primary channels and subdivides both primary channels into two separate secondary channels, creating four secondary channels. All the secondary channels in this embodiment are open along their length.

The construction of FIG. 7, and other constructions having at least two parallel primary channels in combination with a dielectric liner, can be advantageous when the primary channel is conductive. The combination of the dielectric liner 204 and a conductive primary channel 202 may provide sufficient protection to enable high voltage and high current cables to be routed in directly adjacent channels in parallel primary channels. A high voltage in this context is a voltage of 115 V ac or greater. A high current in this context is 15 A ac or greater. Without the dielectric liner high voltage or high current routes in aircraft are required to be separated by at least one raceway and cannot be routed directly next to each other, so that only one such route can be provided in the two channels of FIG. 7. Through the use of the dielectric liner, two such high voltage or high current routes can be provided in the channels.

Figure 8:
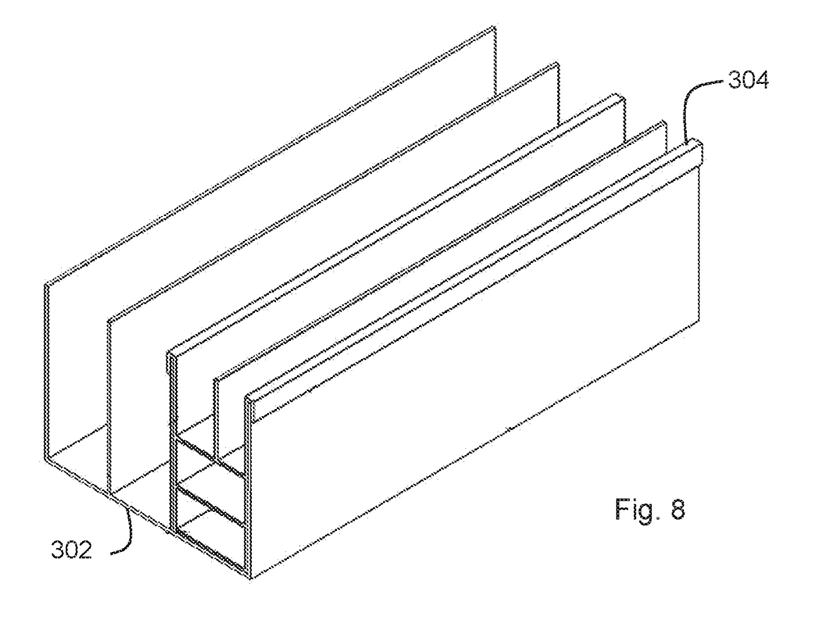
FIG. 8 is a schematic three-dimensional view of a cable raceway and liner according to a further embodiment.

FIG. 8 is a three-dimensional view of another embodiment of a cable routing system. A routing fixture 302 defines three parallel primary channels which are arranged side-by-side. A dielectric liner 304 is inserted into one of the primary channels to subdivide that primary channel into four secondary channels. The secondary channels include two channels which are open along their length and two channels which are closed along their length.

Figure 9:
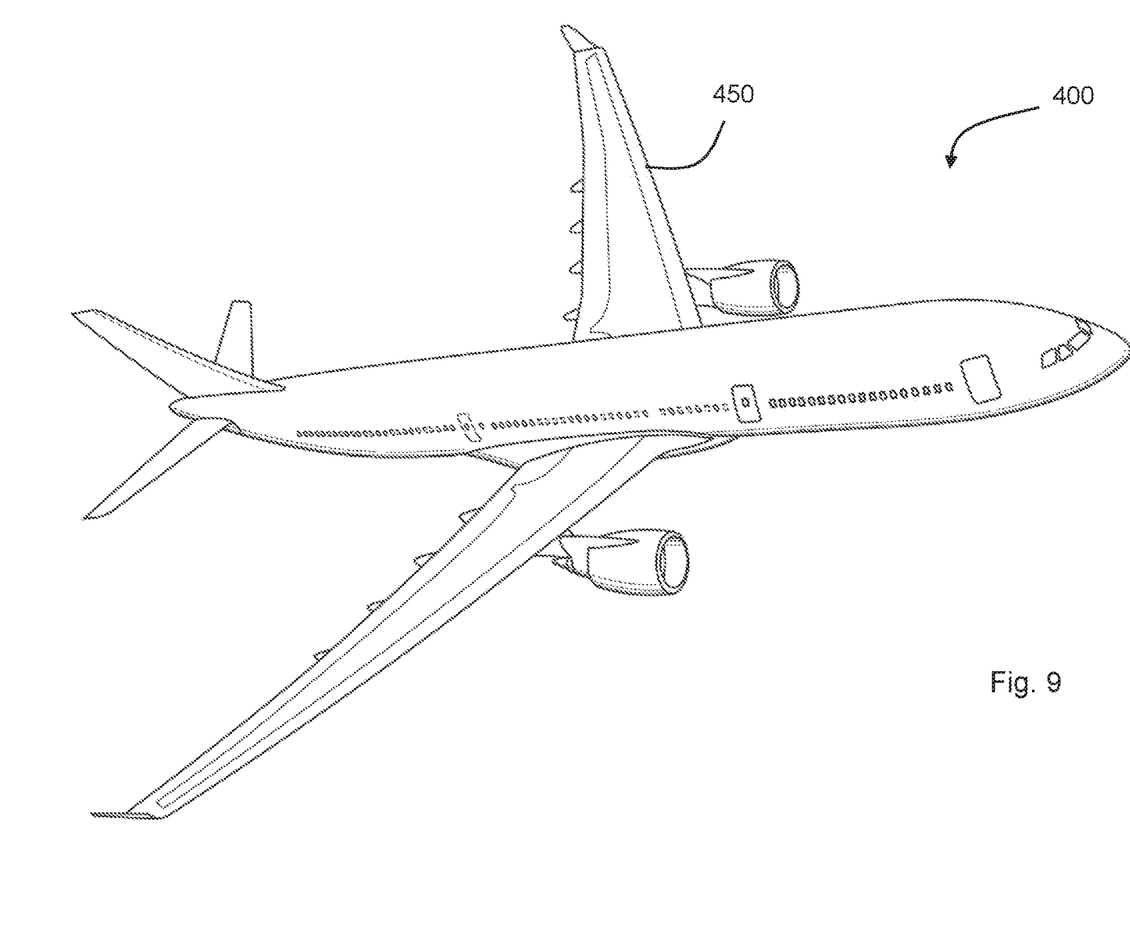
FIG. 9 depicts a schematic three-dimensional view an aircraft in which the cable routing system of FIGS. 1 to 8 can be applied.

The cable routing system of FIGS. 1 to 8 can be applied to an aircraft 400, as depicted in FIG. 9. The additional space efficiency of the cable routing system makes it well suited to use in space constrained areas, such as within a wing 450 of the aircraft 400.

Figure 10:
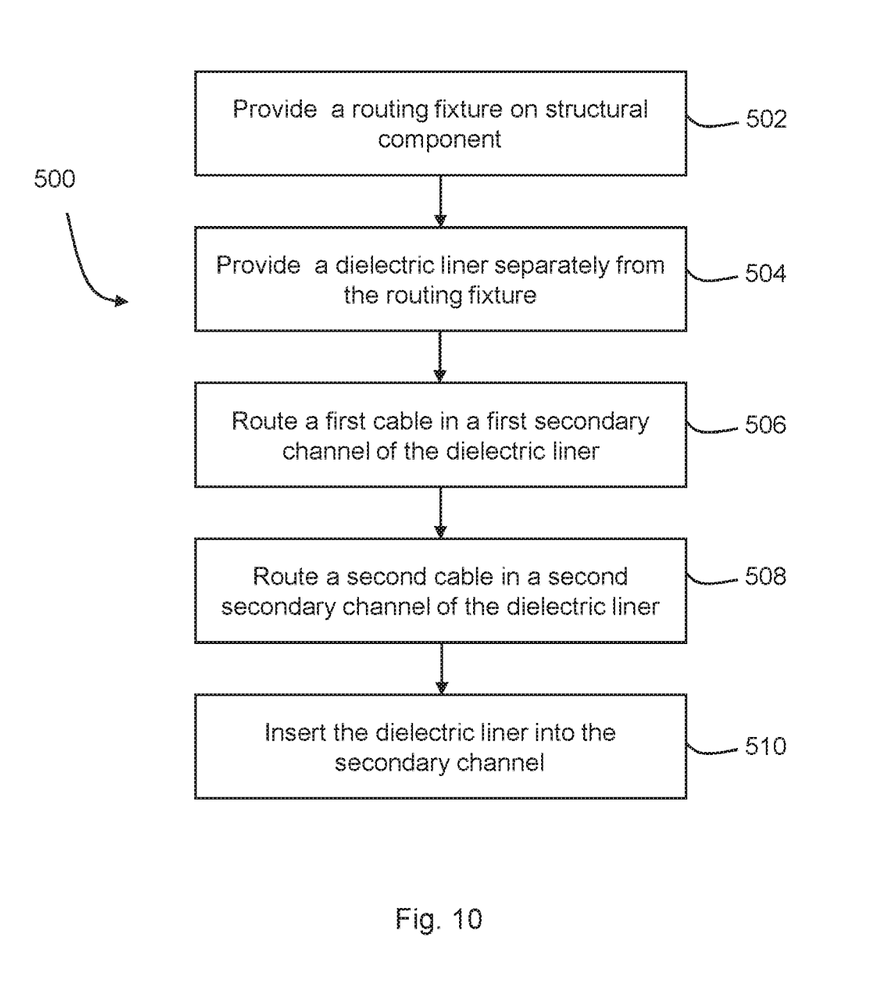
FIG. 10 is a schematic flow chart of a method of installation of a cable routing system according to an embodiment.

A method of installing the cable routing system into an aircraft will now be described with reference to FIG. 10. FIG. 10 depicts a flow chart of a cable installation method 500 according to an embodiment. First, at block 502 a routing fixture which defines a primary channel, or raceway, is provided on a structural component of an aircraft. For example the routing fixture could be affixed to the structural component by bonding or mechanical fixation. Alternatively, the routing fixture could be integrally formed with the structural component, for example by additive manufacturing or extrusion. Suitable structural components in an aircraft on which the routing fixture can be provided include spars and stiffeners in the wings.

Next, at block 504, a dielectric liner, such as that described above with reference to FIGS. 1 to 8, is provided separately from the routing fixture. The dielectric liner is for insertion into the primary channel of the routing fixture and defines at least two secondary channels. Then, at block 506, a first cable is routed in a first secondary channel of the dielectric liner. At block 508, a second cable is routed in a second secondary channel of the dielectric liner. Finally, at block 510, the dielectric liner is inserted into the primary channel complete with pre-installed cables, such that the secondary channels are located within the secondary channel of the dielectric liner, complete with the cables within them.

The dielectric liner may comprise first and second liner parts, such as described above with reference to FIG. 3, with the first liner part and any cables installed in its secondary channels inserted into the primary channel before a second liner part.

A length of the at least two secondary channels may be greater than a length of the primary channel, as described above with reference to FIGS. 5 and 6. The method may comprise providing a second routing fixture on a structural component of the aircraft spaced apart from the routing fixture, wherein the second routing fixture defines a second primary channel. The dielectric liner is then inserted into both the primary channel and the second primary channel after the routing of a first cable and the routing of a second cable such that the dielectric liner extends between the first routing fixture and the second routing fixture. This can remove the requirement for additional shielding or insulation to be provided between channels or raceways, reducing part count and simplifying installation.

The method of FIG. 10 can simplify installation because a complete bundle of cables can be installed together. Maintenance can also be simplified because greater segregation of cables is possible. Parts counts can be reduced because cables requiring addition protection within a raceway, such as ATA-27 control cables, can be routed in a dedicated secondary channel and without requiring an additional sheath according to DIN EN 6049-007.

It is to be noted that the term "or" as used herein is to be interpreted to mean "and/or", unless expressly stated otherwise.

The above embodiments are to be understood as illustrative examples of the invention. Further embodiments of the invention are envisaged. For example, although described in the context of electrical cables, the invention may be applied to any type of cable, including optical, which will still benefit from the increased segregation for ease of installation and maintenance. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aircraft cable routing system comprising:
a cable raceway having a channel-shaped and configuration; and
a dielectric liner configured to be inserted into the cable raceway, wherein the dielectric liner comprises at least one subdividing element such that, when inserted into the cable raceway, the dielectric liner divides the cable raceway into at least two secondary channels positioned within the cable raceway, and wherein the dielectric liner defines a closed secondary channel.

2. An aircraft cable routing system according to claim 1, further comprising a second dielectric liner which defines at least two open secondary channels which are at least partially open along their length.

3. An aircraft cable routing system according to claim 1, wherein the dielectric liner is an assembly comprising a first liner part and a second liner part, and the closed secondary channel is defined by both the first liner part and the second liner part.

4. An aircraft cable routing system according to claim 1, wherein the dielectric liner comprises a retention feature for retaining the dielectric liner in the cable raceway.

5. An aircraft cable routing system according to claim 1, wherein the routing fixture comprises a retention feature for retaining the dielectric liner in the cable raceway.

6. An aircraft cable routing system, comprising:
a routing fixture defining a primary channel;
a dielectric liner for insertion into the primary channel, wherein the dielectric liner commits at least one subdividing element such that, when inserted into the primary channel, the dielectric liner divides the primary channel into at least two secondary channels positioned within the primary channel; and, wherein a length of the at least two secondary channels is greater than a length of the primary channel.

7. An aircraft cable routing system according to claim 6, comprising:
a second routing fixture defining a second primary channel; and
wherein, in use, the second routing fixture is spaced apart from the routing fixture and the dielectric liner is engaged with both the primary channel and the second primary channel such that the dielectric liner extends between the routing fixture and the second routing fixture.

8. An aircraft cable routing system according to claim 1, wherein the dielectric liner comprises thermoplastic composite material, thermoset material, thermoset composite material or a combination thereof.

9. An aircraft cable routing system according to claim 1, wherein a dielectric liner is at least 0.5 mm thick between secondary channels.

10. An aircraft cable routing system according to claim 1, wherein the cable raceway is conductive.

11. An aircraft cable routing system according to claim 1, wherein the cable raceway is not conductive.

12. An aircraft wing comprising an aircraft cable routing system according to claim 1 and at least one cable contained in a secondary channel of the aircraft cable routing system.

13. An aircraft comprising an aircraft cable routing system according to claim 1 and at least one cable contained in a secondary channel of the aircraft cable routing system.

14. A method of installing cables into an aircraft, the method comprising:
providing a routing fixture on a structural component of an aircraft, wherein the routing fixture defines a primary channel;
providing a dielectric liner separately from the routing fixture, wherein the dielectric liner is for insertion into the primary channel and defines at least two secondary channels;
routing a first cable in a first secondary channel of the dielectric liner;
routing a second cable in a second secondary channel of the dielectric liner;
inserting the dielectric liner into the primary channel after the routing a first cable and the routing a second cable, such that the at least two secondary channels are contained within the primary channel.

15. A method according to claim 14, wherein:
the dielectric liner comprises:
a first liner part which at least partially defines the first secondary channel; and
a second liner part which at least partially defines the second secondary channel;
the method comprising:
inserting the first liner part into the primary channel; and
inserting the second liner part into the primary channel after the inserting the first liner part.

16. A method according to claim 14, wherein a length of the at least two secondary channels is greater than a length of the primary channel, the method comprising:
providing a second routing fixture on a structural component of the aircraft spaced apart from the routing fixture, wherein the second routing fixture defines a second primary channel; and
inserting the dielectric liner into both the primary channel and the second primary channel after the routing a first cable and the routing a second cable such that the dielectric liner extends between the routing fixture and the second routing fixture.

17. A cable routing system for an aircraft comprising:
a raceway; and
an insulating liner configured to be inserted into the raceway, wherein the insulating liner comprises at least one subdividing wall such that, when inserted into the raceway, the insulating liner divides the raceway into at least two separate closed secondary channels positioned within the raceway.

* * * * *